United States Patent [19]
Åverin

[11] Patent Number: 4,976,309
[45] Date of Patent: Dec. 11, 1990

[54] AIR CONDITIONER FOR A VEHICLE

[75] Inventor: Gennady V. Åverin, Zaporozhie, U.S.S.R.

[73] Assignee: Zaporozhsky Avtomobilny ZaVod "Kommunar" (Proizvodstvennoe Objedinenie "AV to ZAZ", Zaporozhie, U.S.S.R.

[21] Appl. No.: 444,145

[22] PCT Filed: Feb. 3, 1989

[86] PCT No.: PCT/SU89/00034

§ 371 Date: Nov. 6, 1989

§ 102(e) Date: Nov. 6, 1989

[87] PCT Pub. No.: WO89/08032

PCT Pub. Date: Sep. 8, 1989

[30] Foreign Application Priority Data

Mar. 4, 1988 [SU] U.S.S.R. ............................. 4387009
Nov. 23, 1988 [SU] U.S.S.R. ............................. 4604865

[51] Int. Cl.$^5$ ....................... B60H 3/00; F25B 29/00
[52] U.S. Cl. ......................................... 165/42; 165/43; 165/140; 165/96; 165/97; 165/126; 98/2.08; 98/2.09; 98/2.11; 237/12.3 A
[58] Field of Search ................ 165/42, 43, 96, 97, 165/140, 126; 62/239, 243; 237/12.3 A, 12.3 B; 98/2.08, 2.09, 2.11

[56] References Cited

U.S. PATENT DOCUMENTS 3,670,808  6/1972  Walt, Jr. ............................. 165/42
4,081,025  3/1978  Donaldson .......................... 165/140
4,262,738  4/1981  Kato et al. .............................. 165/43
4,383,642  5/1983  Sumikawa et al. ..................... 165/42
4,520,863  6/1985  Andres et al. .......................... 165/42
4,874,036  10/1989 Masuda ................................. 98/2.11

FOREIGN PATENT DOCUMENTS 1016726  10/1957  Fed. Rep. of Germany ........ 165/43
2362019  3/1978   France .
0018514  1/1982   Japan .................................... 165/43
274409   3/1951   Switzerland .......................... 165/43
1144899  3/1985   U.S.S.R. .
1286811  8/1972   United Kingdom .

Primary Examiner—John Ford
Attorney, Agent, or Firm—Burgess, Ryan & Wayne

[57] ABSTRACT

An air conditioner for a vehicle has a housing (1) accommodating an evaporator (2) and a heater (3) which are connected to a compressor and to an engine cooling system, respectively, and a fan (7) and controlled gates (9, 13) of hot and cool air ducts (8, 12). The evaporator 2 and heater (3) are in the form of a stack of alternating heat exchange plates having passages 4, 5 for a heat carrier. An auxiliary controlled gate (14) of the hot air duct (8) is provided between the fan (7) and the stack of the heat exchange plates for movement between two positions. The gate shuts off a part of the surface of the stack of the heat exchange plates in the first position, and in the second position, the gate uncovers the entire surface of the stack of the heat exchange plates. The invention may be used in self-propelled vehicles.

2 Claims, 8 Drawing Sheets

AIR CONDITIONER FOR A VEHICLE

FIELD OF THE INVENTION

The invention relates to the transportation engineering, and more specifically, it is concerned with an air conditioner for a vehicle.

The field of most effective application of the invention is self-propelled vehicles having a liquid engine cooling system, in particular, automobiles, road building and construction machinery, agricultural machines.

The invention may also be used in various stationary plants.

PRIOR ART

Known in the art is a conditioner (U.S., A, 3670808) which ensures ventilation, cooling and heating of air in the cabin (passenger compartment) of a vehicle. The conditioner consists of a housing divided by an internal partition wall into a condenser compartment and a compartment in which an evaporator and a heater are mounted in series which are connected to a compressor of a refrigerating machine and a cooling system of an engine, respectively. Electric fans for ensuring the necessary air circulation in air ducts are provided in each compartment.

The conditioner is mounted on the roof of a vehicle so that it does not have any limitations as to size, but this position of the conditioner gives rise to an additional aerodynamic drag for a vehicle so that energy performance of the vehicle is impaired and fuel consumption increases.

In addition, supply of heated air to the cabin (passenger compartment) from the top hampers optimum distribution of air flows, namely along the bottom of the cabin (passenger compartment), windscreen and side windows and calls for an auxiliary system of air ducts and room for their accommodation.

Also known in the art is an air conditioner for a vehicle (U.S., A, 4262738) mounted in a cabin (passenger compartment) of a vehicle. The conditioner consists of a housing having an admission part having ports and a controlled gate for the intake of outside and/or recirculation air from the cabin (passenger compartment) of the vehicle, an evaporator and a heater provided therein in series and in a spaced relation to each other, which are connected to a compressor of a refrigerating machine and to an engine cooling system, respectively, an electric fan supplying air through said heat exchangers into the cabin (passenger compartment) of the vehicle, controlled gates provided in hot and cool air ducts, including a gate provided in the space between the heat exchangers.

The conditioner ensures a rational distribution of air flows, but it has a large axial size (because of a tandem position of the heater, evaporator and the gate provided therebetween) so as to hamper its installation under the instrument board and to complicate construction.

The invention is based on the problem of providing a compact air conditioner for a vehicle using a combination heat exchanger which ensures efficient cooling and heating of air.

DISCLOSURE OF THE INVENTION

This problem is solved by that in an air conditioner for a vehicle, comprising a housing accommodating an evaporator and a heater connected to a compressor and to an engine cooling system of the vehicle, respectively, as well as a fan and controlled gates provided in hot and cool air ducts, according to the invention, the evaporator and heater are made in the form of a stack of alternating heat exchange plates having passages for a heat carrier, and the fan is installed upstream the stack of the heat exchange plates in the air flow, an auxiliary controlled gate of the hot air duct being provided between the fan and the stack of the heat exchange plates which is mounted for movement between two positions so that in the first position the gate shuts off a part of the surface of the stack of the heat exchange plates and defines with the shut-off part of the stack and with the housing a front-end space communicating with the hot air duct and in the second position the gate uncovers the whole surface of the stack of the heat exchange plates to shut off the hot air duct, a rear-end space being provided in the housing which communicates with the cool air duct when its gate is in the open position and with the hot air duct when the gate is in the shut position.

The provision of the evaporator and heater in the form of a stack of the alternating heat exchange plates reduces the axial size of the conditioner, lowers its mass and facilitates installation.

In the conditioner according to the invention having a combination heat exchanger for enhancing heat removal which is identical to the heat removal from independent evaporator and heater, a smaller heat transfer surface of the combination heat exchanger is required as the heat exchange plates function as spacers for one another and increase the surface area.

In addition, a less powerful electric fan is required for blowing air through the combination heat exchanger in comparison with the tandem-mounted evaporator and heater.

Energy consumption is also lowered owing to a lower mass of the conditioner as a whole.

In addition, the provision of the auxiliary controlled gate provided between the fan and the stack of the heat exchange plates and the structural arrangement of the air ducts allow the air flow passing through the heat exchanger to be controlled by causing the flow to move through a part of the heat transfer surface of the heat exchanger with preheating of the air and with its subsequent turn through 180° for further heating so as to enhance maximum comfort for operation of a human being.

It is preferred that the rear-end space of the conditioner according to the invention communicate with the front-end space through auxiliary air ducts incorporating controlled gates provided between each of the auxiliary air ducts and the rear-end space, the auxiliary air ducts permanently communicating with the hot air ducts and with ducts for blowing the windscreen.

This construction of the conditioner contributes to enhanced opportunities of dictribution of air flows so as to improve comfort in the cabin (passenger compartment) of the vehicle.

When the air flow is caused to pass through the entire heat transfer surface of the heat exchanger in both cooling and heating modes, the conditioner according to the invention ensures air supply to both bottom and top parts of the cabin (passenger compartment) by opening the gates that shut off the interior spaces of the auxiliary air ducts on the side of the rear end space, the air being admitted to the respective air ducts.

When the air flow is caused to pass through a part of the frontal surface of the heat exchanger and is then caused to turn through 180° for subsequent heating, the auxiliary air ducts are used to guide the heated air from bottom up for blowing the windscreen.

SUMMARY OF THE DRAWINGS

Other objects and advantages of the invention will become apparent from the following detailed description of specific embodiments illustrated in the accompanying draxings, in which.

PREFERRED EMBODIMENT OF THE INVENTION

Figure 1:
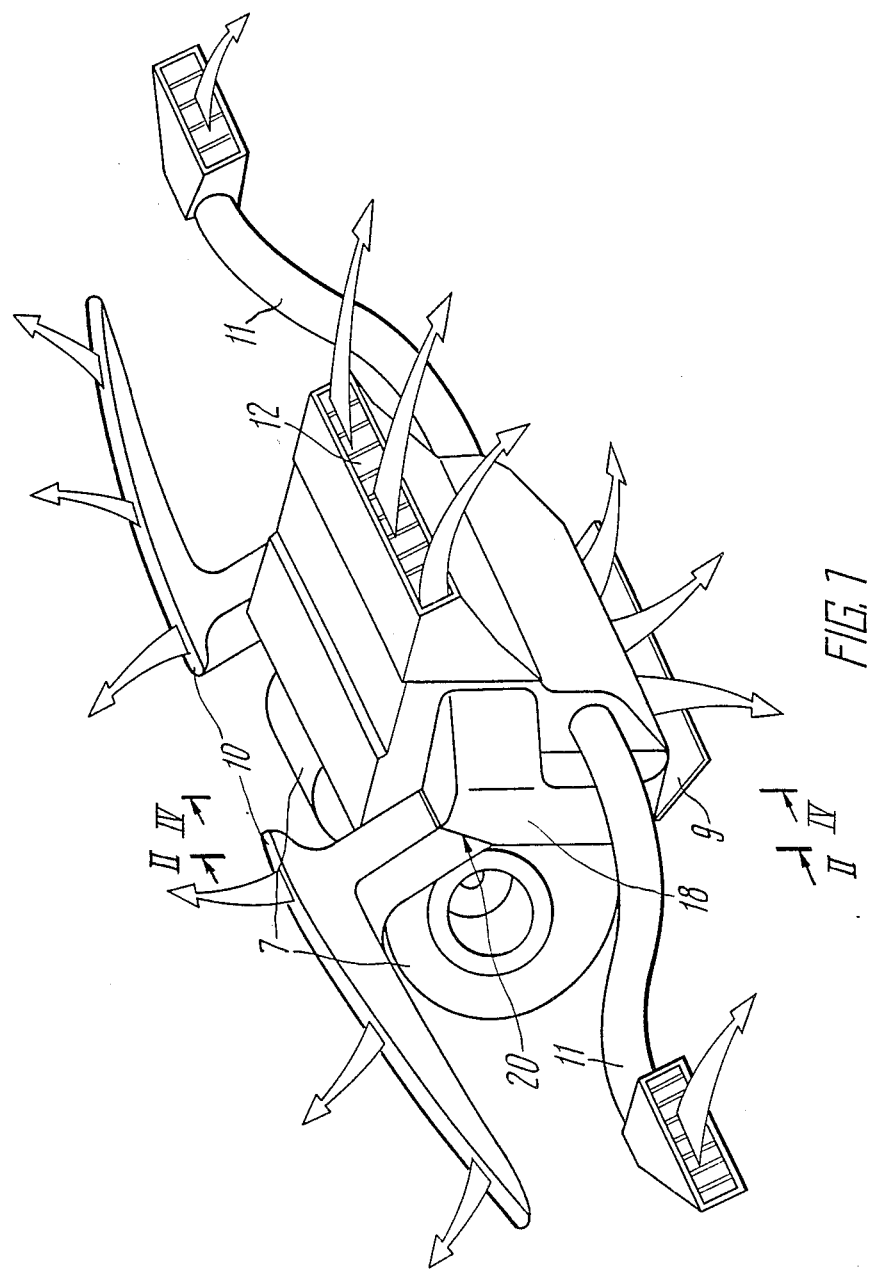
FIG. 1 is a general view of a conditioner according to the invention.
Figure 2:
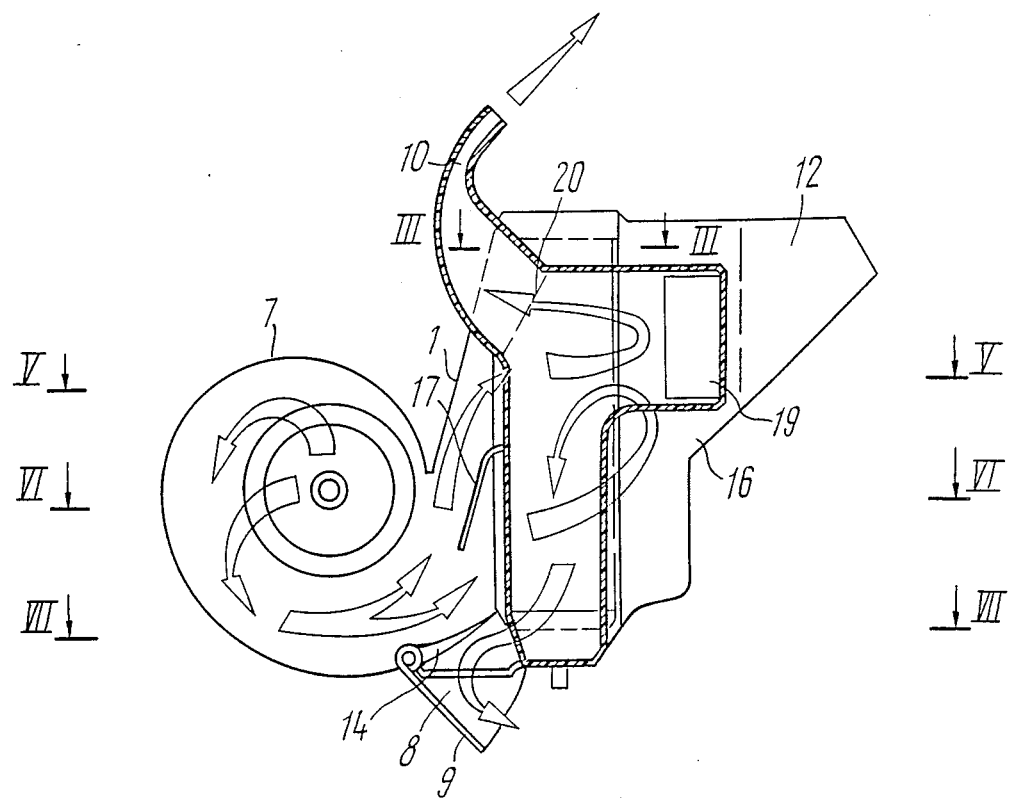
FIG. 2 is a sectional view taken along line II—II in FIG. 1 (operation mode of the conditioner with an auxiliary controlled gate shutting off a hot air duct)
Figure 3:
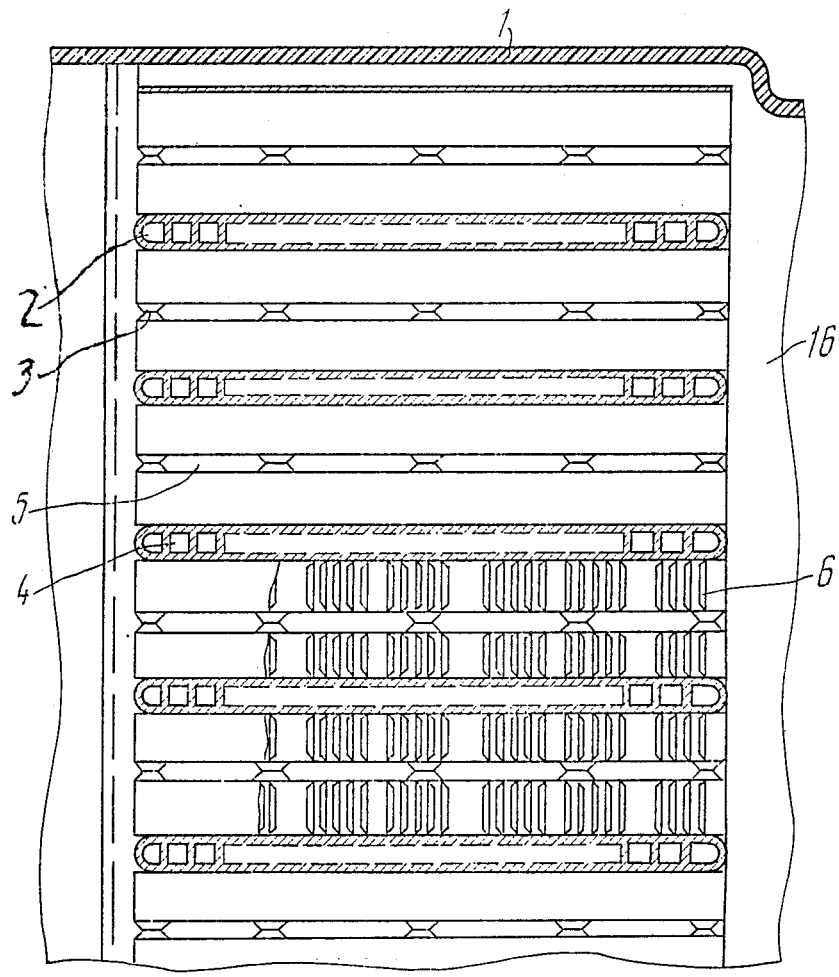
FIG. 3 is a sectional view taken along line III—III in FIG. 2.

An air conditioner for a vehicle comprises a casing 1 (FIGS. 1-8) accommodating a stack of alternating heat exchange plates which form an evaporator 2 and a heater 3, respectively (FIG. 3). The heat exchange plates of the evaporator 2 are in the form of a coil made of a flat multipassage tube which is connected to a compressor of a refrigerating machine (not shown in the drawings), and the plates of the heater 3 are provided between the turns of the coil and connected to an engine cooling system (not shown in the drawings).

Each heat exchange plate has respective passages 4, 5 for the circulation of heat carriers: a refrigerant and a coolant of the engine cooling system. The heat exchange plates of the evaporator 2 and heater 3 are interconnected by means of inserts 6 having a large surface area.

The heat exchange plates function as spacers for one another so as to enlarge the heat exchange surfaces of the evaporator 2 and heater 3.

An electric fan 7 is installed upstream the stack of the heat exchange plates for supplying outside and/or recirculation air through the stack of the heat exchange plates to a hot air duct 8 having a controlled gate 9, air ducts 10 for blowing the windscreen, air ducts 11 for blowing side windows, and an air duct 12 for cool air having a gate 13.

An auxiliary controlled gate 14 of the hot air duct 8 (FIGS. 4, 8) is provided between the electric fan 7 and the stack of the heat exchange plates. The auxiliary controlled gate 14 can move between two position so that in the first position it shuts off a part of the surface of the stack of the heat axchange plates and defines with the shut-off part of the stack of the plates and with the housing 1 a front-end space 15 communicating with the air duct 8 and in the second position it uncovers the entire surface of the stack of the heat exchange plates to shut-off the air duct 8 (FIG. 2). A rear-end space 16 is provided in the housing 1 downstream the stack of the heat exchange plates which communicates with the cool air duct 12 when its gate 13 is in the open position. When the gate 13 is in the shut position, the rear-end space 16 communicates with the hot air duct 8.

The construction of the conditioner described above is not limited to the above description.

In particular, the heat exchange plates of the evaporator 2 may be in the form of turns of a U-shaped configuration which have their admission and discharge manifolds connected in parallel with one another, respectively.

The inserts 6 shown in the drawings are in the form of cornigated tapes with louvers, but other embodiments may be used as well.

The auxiliary controlled gate 14 may also be constructed in various ways.

Figure 4:
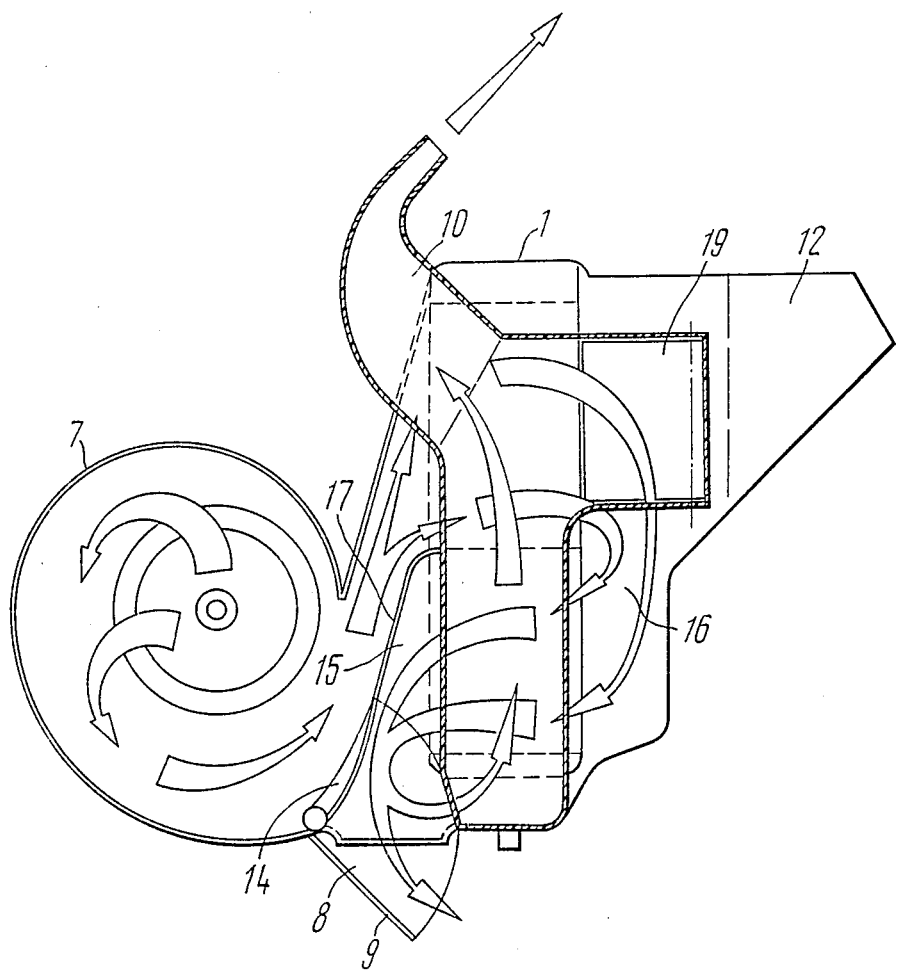
FIG. 4 is a sectional view taken along line IV—IV in FIG. 1 (operation mode of the conditioner when an auxiliary controlled gate shuts off a part of the surface of the stack of the heat exchange plates)
Figure 5:
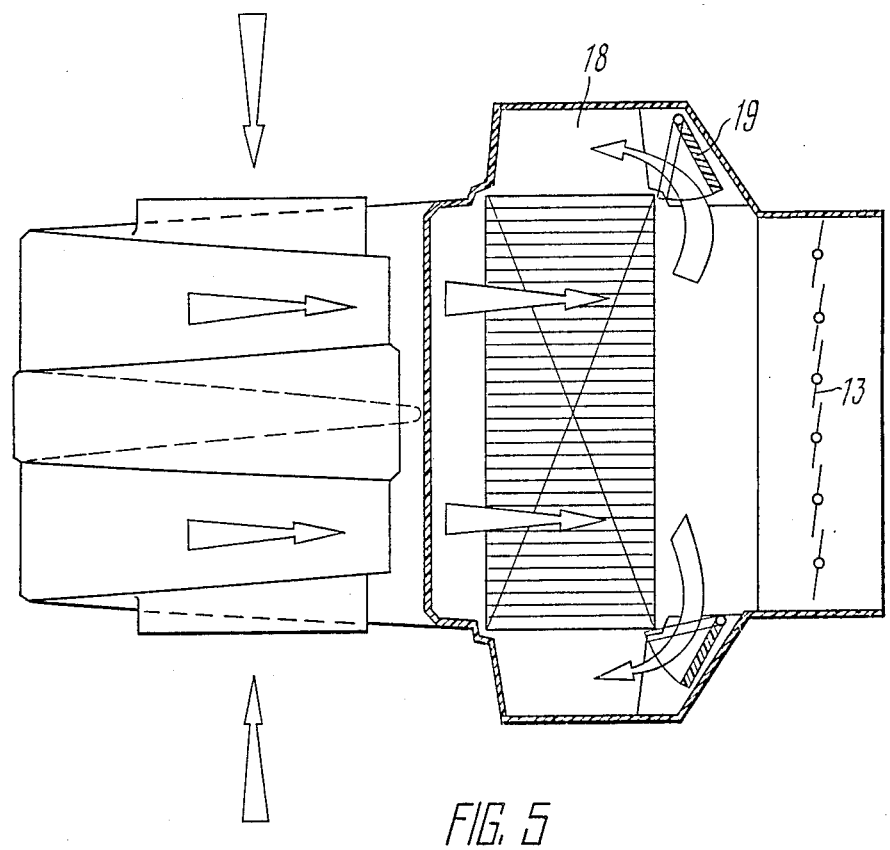
FIG. 5 is a sectional view taken along line V—V in FIG. 2.
Figure 6:
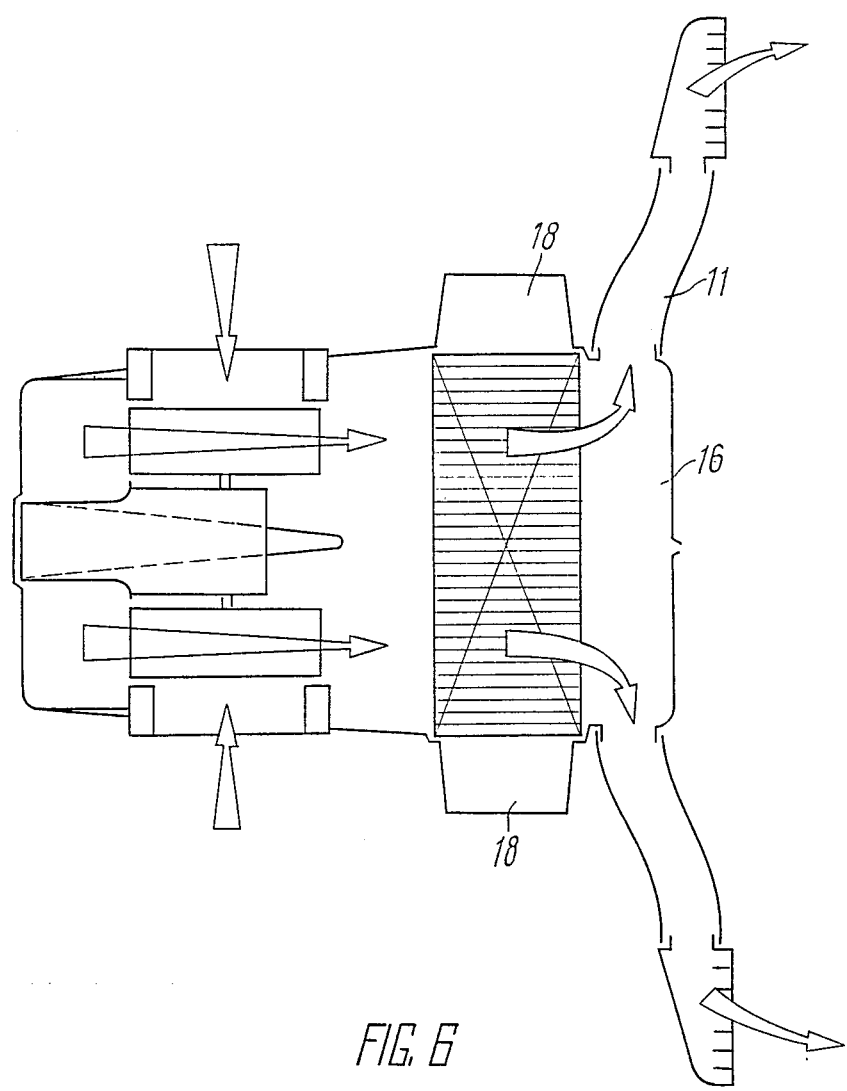
FIG. 6 is a sectional view taken along line VI—VI in FIG. 2.
Figure 7:
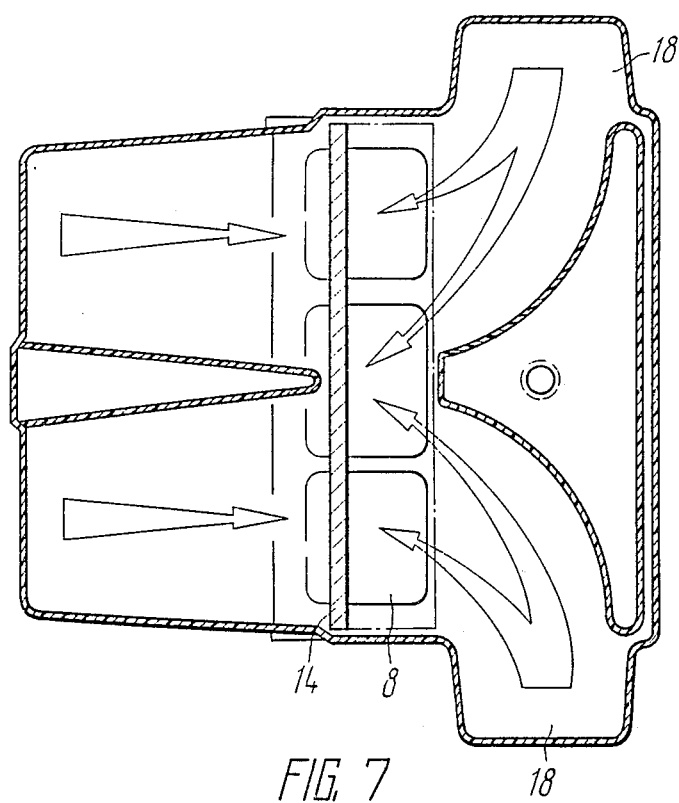
FIG. 7 is a sectional view taken along line VII—VII in FIG. 2.
Figure 8:
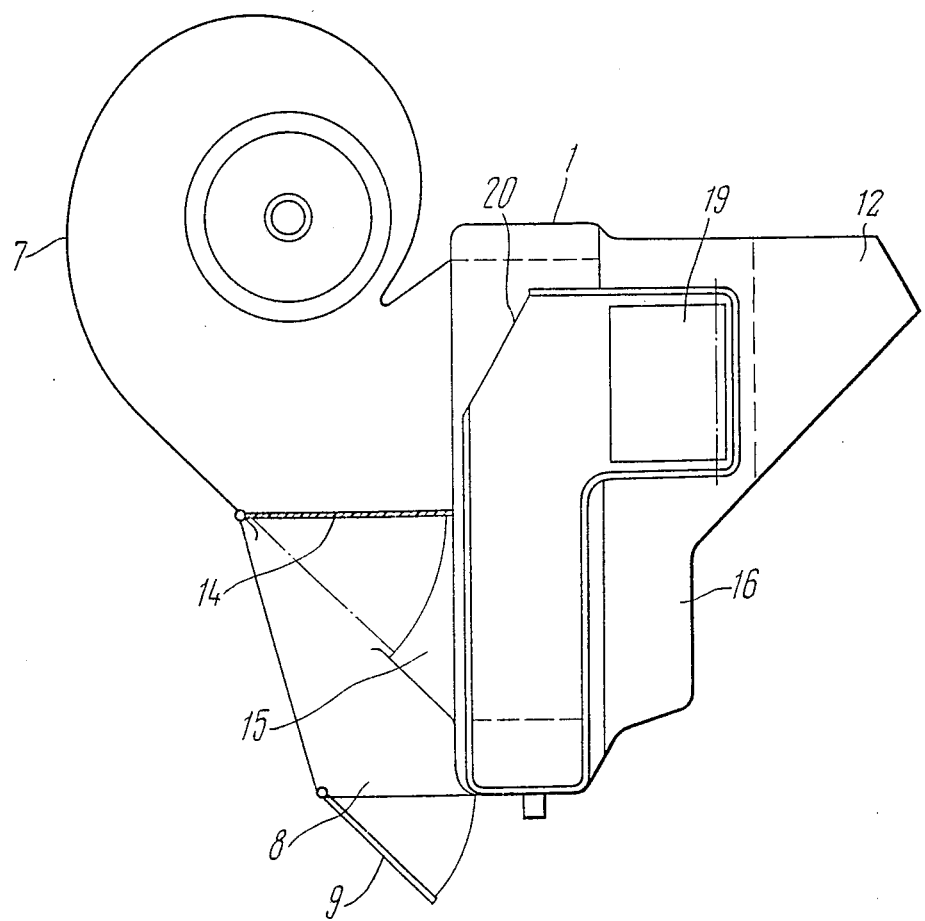
FIG. 8 is an embodiment of a conditioner.

The surface of the gate 14 (FIG. 8) may be accurate enough to shut off a part of the stack of the heat exchange plates, but an embodiment of the gate is also possible when its surface is not large enough to shut off a part of the stack of the heat exchange plates. In this case an apron 17 is rigidly secured to the housing which covers the necessary part of the stack of the plates with the gate 14 (FIGS. 2, 4).

The auxiliary gate 14 may be made of a heat insulating material or it may be coated with such a material to rule out heat influx from the supplied air to the heated air.

An auxiliary air duct 18 having a lateral branch is provided at each end of the housing, the interior of the duct being defined on the side of the interior of the housing 1 by the end face of the stack of the plates and by a controlled gate 19 which shuts off the lateral branch and which allows the auxiliary air duct 18 to communicate with the rear-end space 16.

The auxiliary air ducts 18 permanently communicate with the hot air duct 8 and with the air ducts 10 for blowing the windscreen, and for that purpose openings 20 are provided in the top parts of the air ducts 18.

The conditioner functions in the following manner.

In the cooling mode, the electric fan 7 supplies recirculation air to the entire surface of the stack of the heat exchange plates.

Refrigerant circulates through the passages 4 of the evaporator 2.

As a result of the phase conversion of the refrigerant from liquid to vapour which is accompanied by the removal of heat from the air through the inserts 6 having a large surface area the air is cooled and admitted to the cabin (passenger compartment) of the vehicle through the air duct 12. The air duct 8 in this case is shut off by the auxiliary gate 14, and the air ducts 18 are shut off by their gates 19.

The cool air can thus escape from the rear-end space 16 of the conditioner only through the air duct 12.

When the gates 19 of the air ducts 18 are opened, the cool air is admitted to the latter and, as the air ducts 18 are in permanent communication with the air ducts 10 for blowing the windscreen through the openings 20 and with the hot air duct 8, the cool air will pass through all the outlet air ducts of the conditioner so as to rapidly provide necessary conditions for operation in the cabin (passenger compartment) of the vehicle.

In the heating mode, the air fan supplies outside air to the stack of the heat exchange plates, the liquid of the engine cooling system circulating through the passages 5 of the heater 3.

When air is supplied to the entire surface of the stack of the heat exchange plates, with the controlled gates 14, 9 shutting off the hot air duct 8, the heated air is only admitted to the air ducts 11 if the auxiliary air ducts 18 are shut off by the gates 19 and the air duct 12 is shut of by the gate 13.

With the gates 19 of the air ducts 18 in the open position and with the gate 13 of the air duct 12 in the shut position, the heated air from the rear-end space 16 is admitted to the air ducts 11 for blowing the side windows as well as to the air ducts 18 and through the openings 20 to the air ducts 10 for blowing the windscreen and to the air duct 8 with the gate in the open position. Owing to the shutting-off of the air flows escaping from the air ducts 10, blowing of the windscreen is enhanced.

When a part of the surface of the heat exchange plates is shut off by the auxiliary gate 14, the air supplied by the electric fan 7 passes into the rear-end space 16 of the housing 1. As the air duct 12 is shut off by the gate 13 and the air ducts 18 are shut off by the gates 19, the heated air can only be turned through 180° to pass through the remaining part of the stack of the heat exchange plates and to escape into the front-end space 15. The air is admitted from the latter to the air duct 8 and to the air ducts 18 and, via the openings 20, to the air ducts 10 for blowing the windscreen. The air ducts 11 may be either open or shut at will.

Therefore, the conditioner according to the invention ensures enlarged capabilities of controlling air flows in the cabin (passenger compartment) of the vehicle thus improving conditions for operation of a human being.

The invention is not limited to the abovedescribed embodiments, and other embodiments and modifications can be used without going beyond the spirit and scope of the invention.

INDUSTRIAL APPLICABILITY

The invention may be used in self-propelled vehicles having a liquid engine cooling system, in particular, in automobiles, road building and construction machinery, and in agricultural machines.

What is claimed is:

1. An air conditioner for a vehicle, comprising a housing (1) accommodating an evaporator (2) and a heater (3) which are connected to a compressor and to an engine cooling system of the vehicle, respectively, as well as a fan (7) and controlled gates (9, 13) provided in hot and cool air ducts (8, 12), c h a r a c t e r i z e d in that the evaporator (2) and the heater (3) are made in the form of a stack of alternating heat exchange plates having passages (4, 5) for a heat carrier, whereas the fan (7) is installed upstream the stack of the heat exchange plates in the air flow, an auxiliary controlled gate (14) of the hot air duct (8) being provided between the fan (7) and the stack of the heat exchange plates, which is mounted for movement between two positions so that in the first position the gate shuts off a part of the stack of the heat exchange plates and defines with the shut-off part of the stack of the heat exchange plates and with the housing (1), a front-end space (15) communicating with the hot air duct (8) and in the second position the gate uncovers the entire surface area of the stack of the heat exchange plates to shut off the hot air duct (8), and a rearend space (16) is defined downstream the stack of the heat exchange plates in the housing (1) communicating with the cool air duct (12) when its gate (13) is in the open position and with the hot air duct (8) when the gate (13) is in the shut position.

2. An air conditioner according to claim 1, c h a r a c t e r i z e d in that the rear-end space (16) communicates with the front-end space (15) through auxiliary ducts (18) having controlled gates (19) provided between each of the auxiliary air ducts (18) and the rear end space (16), the auxiliary air ducts (18) permanently communicating with the hot air duct (8) and a duct (10) for blowing the windscreen of the vehicle.

* * * * *